United States Patent
Kogut-O'Connell et al.

(10) Patent No.: US 9,940,681 B2
(45) Date of Patent: *Apr. 10, 2018

(54) PREDICTIVE APPROACH TO CONTRACT MANAGEMENT

(71) Applicant: International Business Machines Corporation, Armonk, NY (US)

(72) Inventors: Judy J. Kogut-O'Connell, Norfolk, MA (US); Sanjeev V. Pradhan, Pune (IN); Ajay Sinha, Pune (IN); Sunil Sridhar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,747

(22) Filed: Sep. 1, 2015

(65) Prior Publication Data

US 2017/0061558 A1    Mar. 2, 2017

(51) Int. Cl.
| | |
|---|---|
| *G06Q 10/06* | (2012.01) |
| *G06Q 10/00* | (2012.01) |
| *G06Q 10/10* | (2012.01) |
| *G06Q 50/18* | (2012.01) |
| *G06N 5/02* | (2006.01) |

(52) U.S. Cl.
CPC ........... *G06Q 50/188* (2013.01); *G06N 5/022* (2013.01); *G06Q 10/06* (2013.01); *G06Q 10/10* (2013.01); *G06Q 50/18* (2013.01); *G06Q 10/00* (2013.01); *G06Q 10/06375* (2013.01)

(58) Field of Classification Search
CPC ........ G06Q 10/06; G06Q 50/18; G06Q 10/10; G06Q 50/188; G06Q 10/00; G06Q 10/06375; G06N 5/02

USPC ............................ 705/37, 311, 80, 342, 7.37
See application file for complete search history.

(56) References Cited

U.S. PATENT DOCUMENTS

| | | | | |
|---|---|---|---|---|
| 6,067,531 | A * | 5/2000 | Hoyt ...................... | G06Q 40/00 705/35 |
| 7,007,227 | B1 * | 2/2006 | Constantino ......... | G06Q 50/188 705/80 |
| 7,028,047 | B2 * | 4/2006 | Boulmakoul ......... | G06F 17/243 707/102 |
| 7,085,926 | B1 * | 8/2006 | Peach .................... | G06Q 20/00 705/64 |

(Continued)

FOREIGN PATENT DOCUMENTS

| | | |
|---|---|---|
| EP | 1296270 A1 | 3/2003 |
| WO | 2014176623 A1 | 11/2014 |

OTHER PUBLICATIONS

IBM®, "IBM Emptoris Contract Management", Empower2015, pp. 1-42, © 2015 IBM Corporation.

(Continued)

*Primary Examiner* — Eric T Wong
*Assistant Examiner* — Joshua D. Bradley
(74) *Attorney, Agent, or Firm* — Brian M. Restauro

(57) ABSTRACT

Embodiments of the present invention provide methods, computer program products, and systems for a predictive approach to contract management. In one embodiment, acceptable contract parameters are predicted based, at least in part on historic data and specified thresholds of identified contract parameters. Predicting acceptable contract parameters can help reduce negotiation cycles.

14 Claims, 5 Drawing Sheets

(56) References Cited

U.S. PATENT DOCUMENTS

| | | | |
|---|---|---|---|
| 7,200,605 B2* | 4/2007 | Baker | G06Q 10/10 707/102 |
| 7,222,109 B1* | 5/2007 | Flanagan | G06Q 30/00 705/80 |
| 7,853,498 B2* | 12/2010 | Finley | G06Q 40/00 705/35 |
| 7,971,068 B2* | 6/2011 | Farquharson | G06F 21/10 713/189 |
| 8,037,004 B2* | 10/2011 | Rajkumar | G06Q 10/0637 706/45 |
| 8,954,839 B2* | 2/2015 | Sharma | G06Q 10/10 715/221 |
| 9,189,741 B2 | 11/2015 | Graupner et al. | |
| 9,330,375 B2* | 5/2016 | Allison | G06Q 10/10 707/600 |
| 9,514,499 B1 | 12/2016 | Kogut-O'Connell et al. | |
| 2002/0042757 A1* | 4/2002 | Albazz | G06Q 30/06 705/26.61 |
| 2002/0042782 A1* | 4/2002 | Albazz | G06Q 10/10 705/80 |
| 2003/0177083 A1* | 9/2003 | Mont | G06Q 40/08 705/36 R |
| 2004/0193643 A1* | 9/2004 | O'Brien | G06Q 10/06 |
| 2005/0015319 A1 | 1/2005 | Guler et al. | |
| 2006/0026005 A1* | 2/2006 | Rogov | G06Q 10/04 705/36 R |
| 2006/0085311 A1* | 4/2006 | Hoerle | G06Q 10/10 705/35 |
| 2007/0016456 A1* | 1/2007 | Himberger | G06Q 10/06 705/301 |
| 2007/0078789 A1* | 4/2007 | Griffit | G06Q 10/00 705/80 |
| 2007/0136126 A1* | 6/2007 | Notani | G06Q 10/06 705/80 |
| 2008/0046265 A1 | 2/2008 | Lee et al. | |
| 2008/0133424 A1 | 6/2008 | Myers et al. | |
| 2009/0177517 A1 | 7/2009 | Nichols et al. | |
| 2009/0216545 A1 | 8/2009 | Rajkumar et al. | |
| 2010/0145767 A1 | 6/2010 | Snow et al. | |
| 2011/0078074 A1 | 3/2011 | Lipman | |
| 2013/0117196 A1 | 5/2013 | Fuad | |
| 2013/0226824 A1 | 8/2013 | Wilson et al. | |
| 2013/0246326 A1 | 9/2013 | Graupner et al. | |
| 2013/0262169 A1 | 10/2013 | Van Der Vyver et al. | |
| 2013/0332481 A1 | 12/2013 | Lau et al. | |
| 2014/0052575 A1 | 2/2014 | Yu et al. | |
| 2014/0053069 A1 | 2/2014 | Yan | |
| 2014/0067874 A1 | 3/2014 | Bhattacharjee et al. | |
| 2014/0129276 A1* | 5/2014 | Agrawal | G06Q 10/0637 705/7.15 |
| 2014/0279333 A1 | 9/2014 | Galvin et al. | |
| 2015/0073878 A1* | 3/2015 | Sheppard | G06Q 10/06395 705/7.41 |
| 2015/0212997 A1 | 7/2015 | Kassim et al. | |
| 2015/0262126 A1* | 9/2015 | Gillespie | G06Q 10/10 705/342 |
| 2015/0269692 A1* | 9/2015 | Ryan | G06Q 10/00 705/311 |
| 2015/0294246 A1 | 10/2015 | Guven Kaya et al. | |
| 2015/0302494 A1* | 10/2015 | Al Dawood | G06Q 30/0609 705/26.35 |
| 2016/0026620 A1 | 1/2016 | Gidney | |
| 2016/0086112 A1* | 3/2016 | Sundaresan | G06Q 10/0635 705/7.28 |
| 2016/0171635 A1 | 6/2016 | Senzee | |
| 2016/0267563 A1* | 9/2016 | Follis | G06Q 30/0609 |
| 2017/0011313 A1* | 1/2017 | Pochert | G06Q 10/063 |

OTHER PUBLICATIONS

"Using proactive remedies to solve outsourcing contract problems", Out-Law.com, Legal news and guidance from Pinsent Masons, printed on Apr. 28, 2015, pp. 1-3, © Copyright Pinsent Masons LLP, <http://www.out-law.com/en/topics/tmt--sourcing/outsourcing/using-proactive-remedies-to-solve-outsourcing-contract-problems/>.

U.S. Appl. No. 14/977,898, Entitled "Predicitve Approach to Contract Management", Filed on Dec. 22, 2015.

Appendix P.: List of IBM Patents or Patent Applications Treated as Related, Dated Feb. 2, 2016, 2 pages.

Kogut-O'Connell et al.; U.S. Appl. No. 15/252,929, filed Aug. 31, 2016; Entitled "Predictive Approach to Contract Management".

List of IBM Patents or Patent Applications Treated as Related; Dated Sep. 7, 2016; 2 pages.

Bhattamishra, Rachita, "Driving Process Excellence through Intelligent Automation across the Contract Mangement Lifecycle", Jul. 2015, Cognizant 20-20 Insights, 6 pages.

"Contract Management", Salesforce.com, accessed the Mar. 19, 2015 version via the Wayback Machine on Jul. 28, 2016, 8 pages.

"Contract Management System Architecture Data Sheet", Oracle, Oct. 2012, 5 pages.

"Solutions for Contract Management", Xerox Corporation, Copyright 2014, 4 pages.

Kogut-O'Connell et al., "Predictive Approach to Contract Management", U.S. Appl. No. 15/252,929, filed Aug. 31, 2016, 26 pages.

Appendix P, List of IBM Patents or Patent Applications Treated as Related, dated Jan. 10, 2017, 2 pages.

Kogut-O'Connell et al., "Predictive Approach to Contract Management", U.S. Appl. No. 15/659,802, filed Jul. 26, 2017, 21 pages.

List of IBM Patents or Patent Applications Treated as Related; Filed Herewith; 2 pages.

* cited by examiner

PREDICTIVE APPROACH TO CONTRACT MANAGEMENT

BACKGROUND OF THE INVENTION

The present invention relates generally to the field of contract management, and more particularly to predictive analysis of contracts.

Generally, contract management refers to negotiating, supporting, and creating effective contracts and their respective terms and conditions. Contract management reporting involves monitoring details in contract parameters such as tracking, milestones, and obligations. Typically, these details are used to identify potential problem areas and are monitored manually.

SUMMARY

Embodiments of the present invention provide methods, computer program products, and systems for a predictive approach to contract management. In one embodiment of the present invention, a method is provided comprising: identifying one or more contract parameters of a contract, wherein each of the one or more contract parameters is associated with a specified threshold; accessing historic data comprising previously approved contract parameters; and predicting acceptable contract parameters based, at least in part on the historic data and the specified threshold.

DETAILED DESCRIPTION

Embodiments of the present invention recognize the need for more effective contract management. Sometimes, recording data from contracts can be transposed incorrectly (e.g., fee schedules). In other instances, embodiments of the present invention recognize that certain contract parameters such as clause language can be a source of delay in contract negotiations. For example, two parties can dispute intellectual property rights as to background intellectual property. Embodiments of the present invention provide solutions to identify contract parameters and predict, based, at least in part, on historic data, optimal contract parameters and terms, that would shorten negotiation and internal workflow cycles. In this manner, as discussed in greater detail in this specification, embodiments of the present invention can be used to predict contract parameters and terms without having to manually identify and analyze these contract properties.

Figure 1:
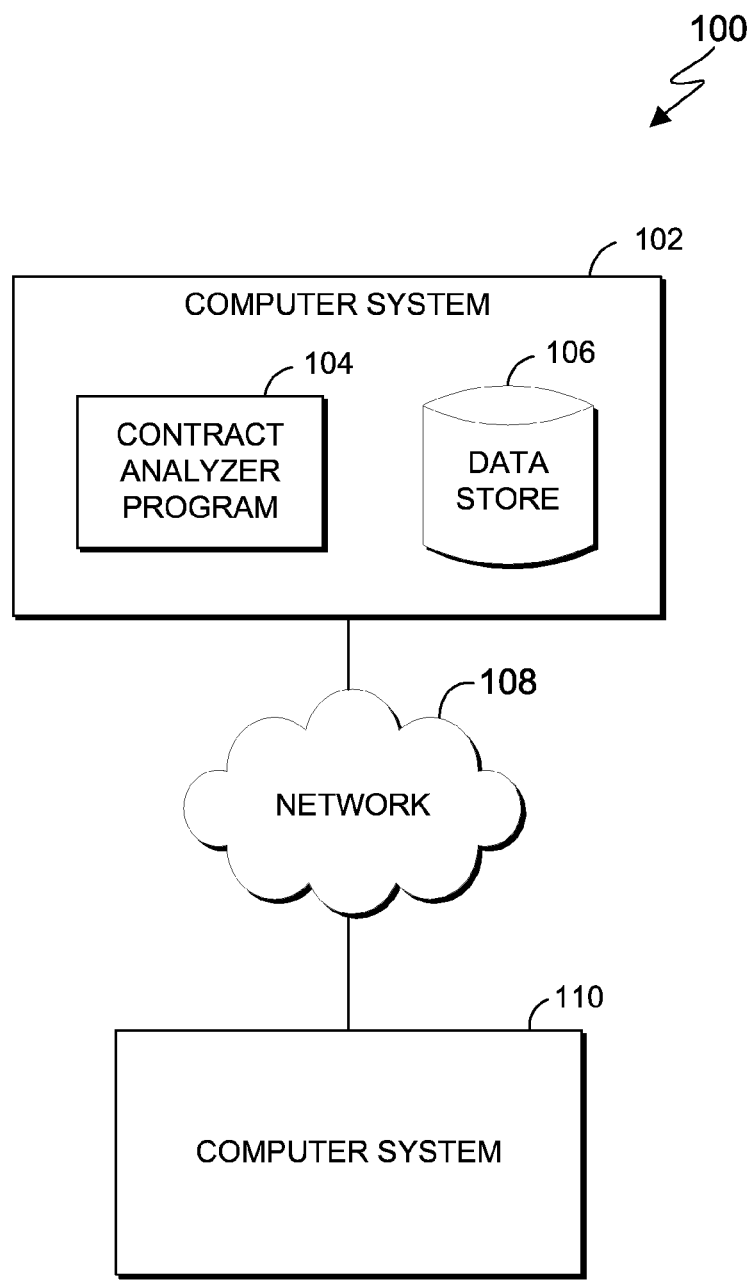
FIG. 1 is a block diagram of a computing environment, in accordance with an embodiment of the present invention.

FIG. 1 is a functional block diagram of computing environment 100, in accordance with an embodiment of the present invention. Computing environment 100 includes computer system 102 and computer system 110. Computer system 102 and computer system 110 can be desktop computers, laptop computers, specialized computer servers, or any other computer systems known in the art. In certain embodiments, computer system 110 and computer system 110 represent computer systems utilizing clustered computers and components to act as a single pool of seamless resources when accessed through network 108. For example, such embodiments may be used in data center, cloud computing, storage area network (SAN), and network attached storage (NAS) applications. In certain embodiments, computer system 102 and computer system 110 represent virtual machines. In general, computer system 102 and computer system 110 are representative of any electronic devices, or combination of electronic devices, capable of executing machine-readable program instructions, as described in greater detail with regard to FIG. 5.

Computer system 102 includes contract analyzer program 104 and data store 106. Contract analyzer program 104 identifies contract parameters, analyzes received contract parameters, predicts contract terms likely to be accepted by users, and generates suggestions based, at least in part, on historic data to computer system 110 via network 108. Contract analyzer program 104 saves analyzed contracts and contract parameters in data store 106. The phrase "contract parameter", as used herein, refers to provisions of a contract (e.g., parties involved in a contract, approvers of a contract, clause language, contract terms, status, products involved, reviewers, pending tasks, revisions, lines, events defined in contract, relationships, attachments, security permissions, value of the contract, conditions subsequent, etc.) as well as any other contract metric of interest to a user. For example, a contract parameter may be the length of time between contract negotiations to finalization of a contract, the time period to be considered for analysis, etc. A contract parameter can also include contract terms. For example, contract parameters can also be delivery days, payment terms, important milestone dates, rates for labor, vendor type, trading goods catalogue, etc. In this embodiment, a "template" can refer to a pre-defined collection of clauses, approver lists, etc. In general, a template can be any other historic data that can be used for predictive analysis of contracts. In contrast, an "instance" of a contract can refer to the actual contract being modified (i.e., a contract and its parameters and terms that have been received for modification).

Figure 3:
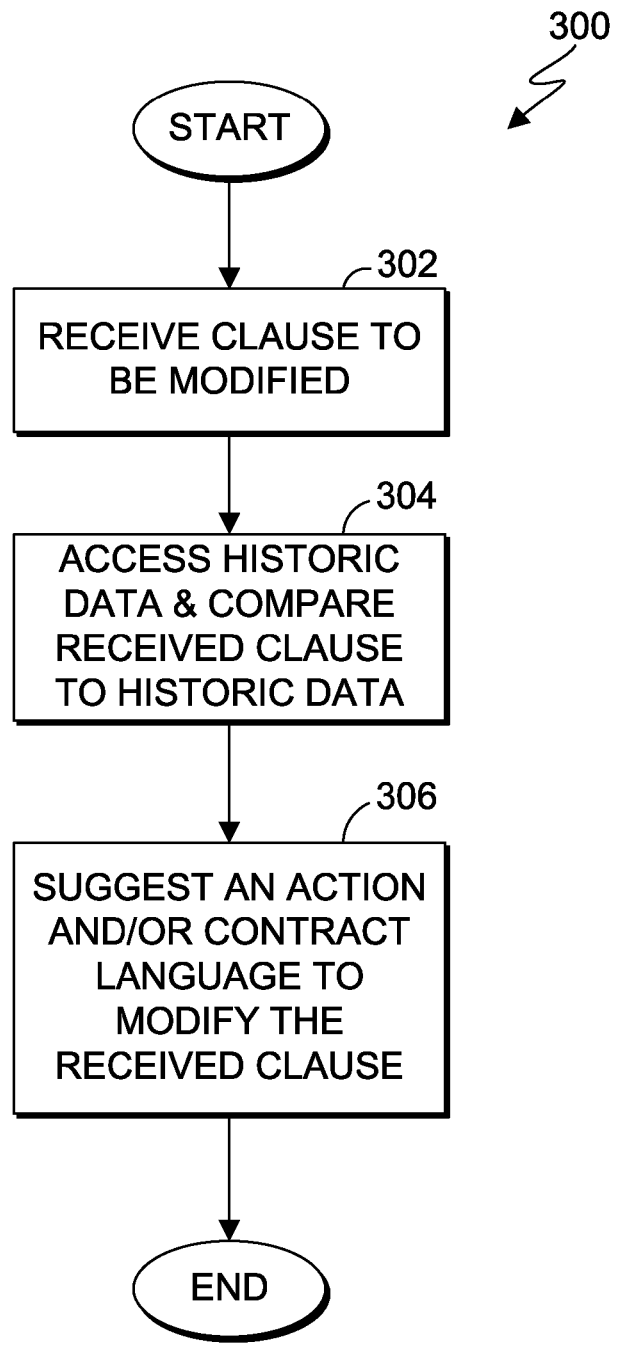
FIG. 3 is a flowchart illustrating operational steps for analyzing contract parameters, in accordance with an embodiment of the present invention.
Figure 4:
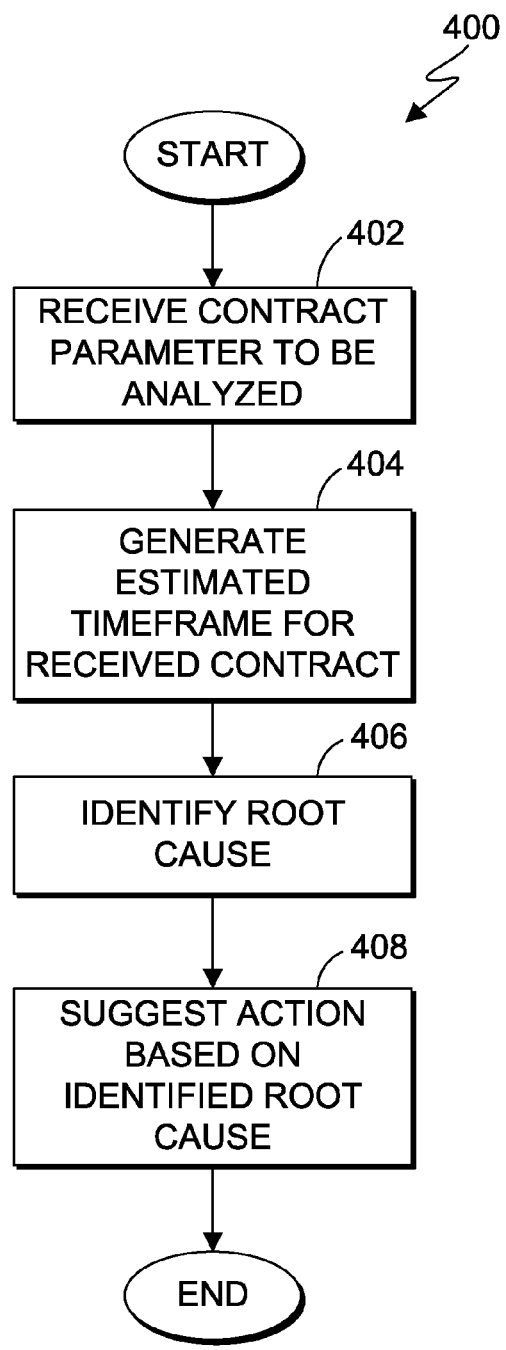
FIG. 4 is a flowchart illustrating operational steps for determining a root cause for a delay using predictive analysis of contract parameters, in accordance with an embodiment of the present invention.

In certain embodiments of the present invention, contract analyzer program 104 can further monitor changes to contract parameters (e.g., modifications to a particular clause in a contract), generate trend lines for modifications made to boilerplate language based, at least in part on the analyzed contract parameters, and identify potential problems with contract clause language, as discussed in greater detail in FIGS. 3-4. For example, contract analyzer program 104 can monitor changes to a specific boilerplate contract clause language regarding arbitration. Contract analyzer program 104 can identify over a configurable time period (e.g., six months) that the number of modifications to the arbitration clause could indicate problems between parties using the boilerplate and suggest different language that would be acceptable. In general, data generated from the analysis generated from contract analyzer program 104 can be filtered by any user-defined criteria. For example, data can be filtered based on contract region or suppliers.

In other embodiments of the present invention, contract analyzer program 104 can then notify a user that changes to the boilerplate language have been made. For example, contract analyzer program 104 can detect clause changes in multi-lingual contracts by identifying a modified clause. In this embodiment, contract analyzer program 104 can access a database of boilerplate contracts (i.e., standard contracts used as templates), detect changes to boilerplate contract language, and notify a user of changes to the contract. For example, contract analyzer program 104 can access a boilerplate contract for suppliers in English and have boilerplate contracts that are translated to different languages (i.e., the English boilerplate contract for suppliers translated to other languages such as Spanish). Contract analyzer program 104 can then detect changes to the boilerplate contract language by comparing a received, modified contract to the boilerplate contract. Contract analyzer program 104 can then notify a user of changes to the boilerplate contract. In this embodiment, contract analyzer program 104 can set a threshold number of changes and alert a user responsive to reaching or exceeding the threshold value. For example, a user may set the threshold for modifications to five modifications. Responsive to reaching or exceeding five modifications, contract analyzer program 104 can send a notification that the threshold has been reached. In this embodiment, the alert can include the changed text as well as the boilerplate from which the changed text was based on. For example, contract analyzer program 104 can detect that the threshold value of modifications has been reached for an arbitration clause. Contract analyzer program 104 can then send an alert that includes the identified modified arbitration clause as well as the boilerplate arbitration clause.

In other embodiments, responsive to reaching or exceeding the number of modifications, contract analyzer program 104 can prompt the user to confirm that the modifications still conform to the broad outline of changes to the standard legal boundaries allowed. The alert could further display the modified text. In this embodiment, users maintaining the standard templates in multiple languages can be alerted so that corrective actions can be taken to avoid further delays in contracts due to required changes. For example the modification to an arbitration clause in country X is modified from "binding both parties to the decision of the arbiter" to "the decision of the arbiter is non-binding on both parties and legal action may be pursued". Contract analyzer program 104 can then alert the user (e.g., a template administrator) regarding the change to the arbitration clause and further suggest correct action (e.g., legal action after willfully submitting to arbitration cannot be pursued in country X, although it may be legal in country Y). In other embodiments, contract analyzer program 104 can suggest contract language based, at least in part, on identified contract language in historic data that has been previously approved, or alert the user to an action (e.g., contact a legal team, contact an approver, etc.).

Data store 106 stores historic data of previous contracts and contract parameters. The term "historic data", as used herein, refers generally to previously analyzed contracts and contract parameters associated with previously analyzed, approved contracts, as well as versions of approved contracts that were rejected. For example, historic data can include internal and external parties, approver profiles negotiator profiles, clause language, terms, products, status and time related metrics, modifications made to previously approved clause language etc. In general, data store 106 can be implemented with any storage medium known in the art.

Network 108 can be, for example, a local area network (LAN), a wide area network (WAN) such as the Internet, or a combination of the two, and include wired, wireless, or fiber optic connections. In general, network 108 can be any combination of connections and protocols that will support communications between computer system 102 and computer system 110, in accordance with a desired embodiment of the invention. For illustrative purposes, this embodiment may be discussed with respect to computer system 102 receiving contract parameters and performing predictive analysis to generate options for a user, it being understood that either of the computer systems 102 and 110 can receiving contract provisions and perform predictive analysis to generate options for the user. An "option" or "action", as used herein, refers generally to suggested contract language, contract clauses, and/or an alert to a user to take specific action.

Figure 2:
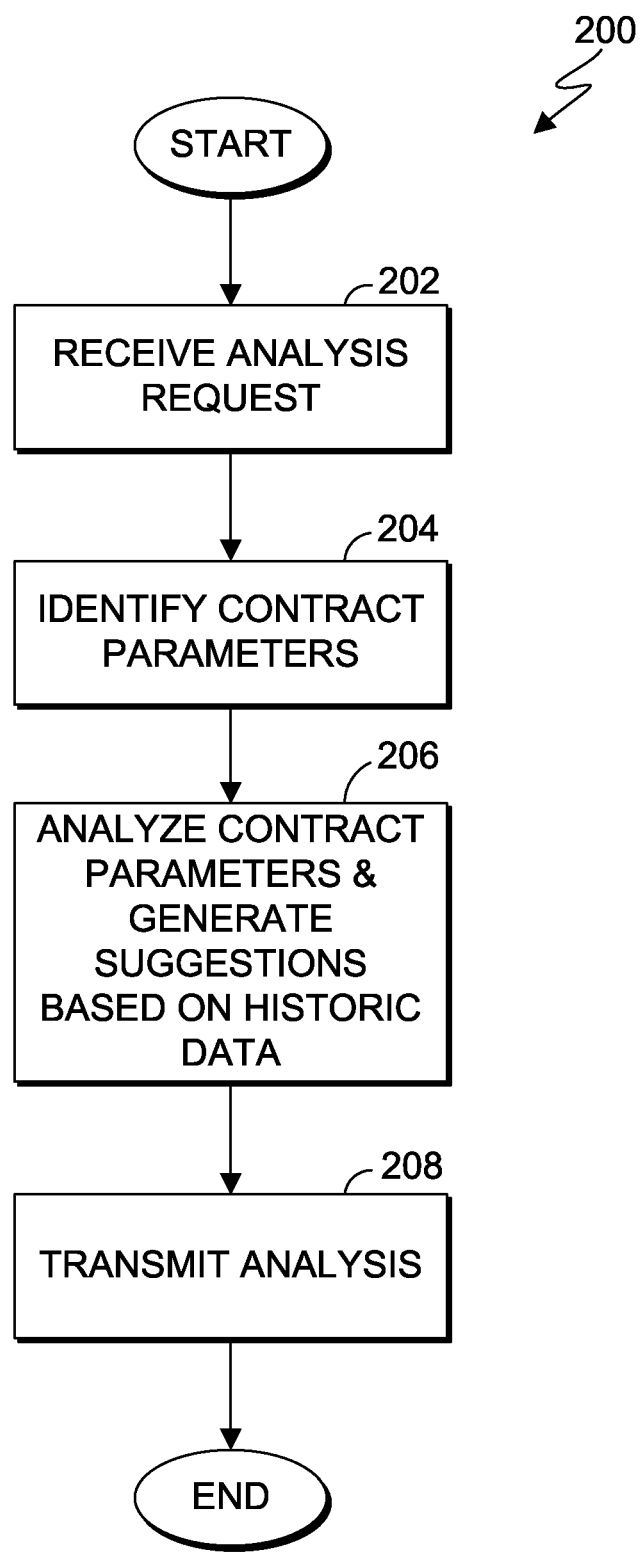
FIG. 2 is a flowchart illustrating operational steps for predictive analysis of contract parameters, in accordance with an embodiment of the present invention.

FIG. 2 is a flowchart 200 illustrating operational steps for predictive analysis of a contract provision, in accordance with an embodiment of the present invention.

In step 202, contract analyzer program 104 receives an analysis request from computer system 110. In this embodiment, an analysis request can include a contract in progress and a description of a problem to be addressed. Examples of the description of the problem can be a requirement that further corrections are required, the need to view the best possible term values, the need to view clause modifications, at risk or non-compliant parties need to be identified, etc. In other embodiments, contract analyzer program 104 can receive a contract to be analyzed from one or more other components of computing environment 100.

In step 204, contract analyzer program 104 identifies contract parameters of the received contract. In this embodiment, contract analyzer program 104 identifies contract parameters of the received contract by parsing the contract. For example, contract analyzer program 104 can use natural language annotations (e.g., sentence splitting, tokenization, POS tagging, chunking, dependency parsing, and anaphora resolution, etc.) to process the semantics of the contract and identify contract parameters such as parties involved in a contract, approvers of a contract, clause language, contract terms, status, products, etc. In other embodiments, contract analyzer program 104 can receive user-defined contract parameters.

In step 206, contract analyzer program 104 analyzes the contract parameters and generates suggestions based on historic data. In this embodiment, contract analyzer program 104 analyzes the contract provisions by accessing historic data from data store 106 and generating suggestions for a user, as discussed in greater detail in FIGS. 3 and 4.

In step 208, contract analyzer program 104 transmits the analysis to computer system 110 via network 108. The analysis can then be displayed in any user-defined visual manner. In this embodiment, the analysis can be mapped to show information about the analyzed contract. For example, the analysis can be mapped to a relational data structure such as a tree that can display contract parameters and other contract metrics, as well as suggested actions. In other embodiments, contract analyzer program 104 can transmit the analysis to one or more other components of computing environment 100. Additionally, contract analyzer program 104 can display an approval ratio of contract language (e.g., a contract clause) based, at least in part, on the overall parameters of the contract. In this embodiment, a numerical percentage scale is used where higher percentages indicate a higher chance of approval. Accordingly, a high percentage (e.g., a 60% chance of a successful contract) indicates a better chance of contract execution with lesser approver rejections, short negotiation cycles, and less delays due to modifications in the standard language. Contract analyzer program 104 can further suggest that if corrective action is taken on one of the contract parameters, the success ratio will increase to 85%, thus predicting successful outcomes.

FIG. 3 is a flowchart 300 illustrating operational steps for analyzing a contract provision, in accordance with an embodiment. For example, the operational steps of flowchart 300 can be performed at step 206 of flowchart 200.

In step 302, contract analyzer program 104 receives a clause to be modified from computer system 110. For example, contract analyzer program 104 can receive an arbitration clause to be modified. In other embodiments, contract analyzer program 104 can receive a clause to be modified from one or more other components of computing environment 100.

In step 304, contract analyzer program 104 accesses historic data from data store 108 and compares previously approved clauses that match the type of clause to be modified. Continuing the example above, contract analyzer program 104 accesses historic data that matches the clause "type" to be modified (e.g., one or more previously approved arbitration clauses) and selects contract clauses that match the clause type to be modified. For example, contract analyzer program 104 can select previously approved arbitration clauses from data store 106, compare the previously approved arbitration clauses to the arbitration clause to be modified, and display the discrepancies or allow users to select previously approved arbitration clauses as alternates that would be likely candidates that would be approved.

In step 306, contract analyzer program 104 suggests an action and/or contract language to modify the received clause. In this embodiment, an action can be to insert suggested contract language and/or an alert to a user to take specific action. In this embodiment, contract analyzer program 104 leverages the historic data to identify likely contract language that would be approved based on the profiles of the approvers by cross-referencing the likely contract language with the profiles of the approvers. Continuing the example above, contract analyzer program 104 cross-references previous approvers associated with the previously approved arbitration clauses with the approvers associated with the arbitration clause to be modified. For example, contract analyzer program 104 can identify from the contract parameters that previously approved arbitration clause $AC_{PA1}$ had approvers A and B and that arbitration clause to be modified $AC_{TBM}$ has approver A. Contract analyzer program 104 can then suggest previously approved arbitration clause $AC_{PA1}$ as the alternate contract clause that would likely be approved for the contract clause to be modified (e.g., arbitration clause to be modified $AC_{TBM}$). In other words, contract analyzer program 104 can cross-reference previous approvers associated with previously approved contract clauses (e.g., an arbitration clause) with approvers associated with the contract clause (e.g., the arbitration clause) to be modified, flag language modified that differs and, to the extent that contract analyzer program 104 identifies the contract clause being modified has been rejected in the past, can suggest alternate contract clauses that have been approved in the past.

Contract analyzer program 104 can then display a visual representation of the analysis (i.e., suggests an action and/or contract language to modify the received clause). In this embodiment, contract analyzer program 104 can display the suggested action and/or suggested contract language in-line with a flagged contract clause. For example, an arbitration clause could be flagged as being inconsistent with local laws. Contract analyzer program 104 can then display the suggested contract language that would be consistent with local laws. For example, contract analyzer program 104 can visually display a suggestion to change the arbitration clause which currently states that "the decision of the arbiter is binding to both parties" to "the decision of the arbiter is non-binding on both parties". In other embodiments, contract analyzer program 104 the visual representation of the analysis can be in the form of a new document highlighting potential issues along with the suggested changes. Other embodiments of the present invention can generate a new document (i.e., a new contract) that previews what the contract being modified would look like with the accepted changes that contract analyzer program 104 generated.

In another embodiment, contract analyzer program 104 can further display other relevant information to the contract parameters with the analysis. In this embodiment, contract analyzer program 104 can parse through historic data to display other relevant information to contract parameters with the analysis. For example, contract analyzer program 104 can identify a contract parameter as "approvers" along with a description that further corrections are required. Contract analyzer program 104 can then display other relevant information identified from historic data to the user. For example, contract analyzer program 104 can display previous clauses that were rejected by approvers and suggest contract language that would likely be approved by the approver as well as different actions a user can take (e.g., contact the approver or contact a legal team to finalize contract language).

In another example of other relevant information that contract analyzer program 104 can display with the analysis pertains to parties that may or may not be at risk of non-compliance with regulations. For example, contract analyzer program 104 can parse through historic data to display relevant information to a contract parameter pertaining to suppliers along with a description that suppliers may be non-compliant or at risk. Contract analyzer program 104 can, in addition to suggesting contract language to mitigate a supplier's risk, display relevant information such as time taken by a supplier for activation, the status of a contract, and disputed items.

In another embodiment, contract analyzer program 104 can also display modification data in addition to the previously generated suggestions based on the historic data. For example, contract analyzer program 104 can parse through historic data to generate a trend line of modification data for a received contract analysis request. The term "modification data", as used herein, refers to data in one or more received contracts that have been modified and/or changed in some way. For example, modification data can track modifications from standard language, alternate clauses used, terms modified in the clauses, changes made by the other party, amended clauses, approvers who rejected clause changes, etc. Contract analyzer program 104 compares changes made to contract parameters by parsing through the contract and comparing the current contract to a boilerplate contract (i.e., a template contract) accessed from data store 106. Contract analyzer program 104 can then identify changes and generate a trend line that indicates problems with the template contract.

FIG. 4 is a flowchart 400 illustrating operational steps for determining a root cause for a delay using predictive analysis of contract parameters, in accordance with an embodiment of the present invention. For example, the operational steps of flowchart 400 can be performed at step 206 of flowchart 200.

In step 402, contract analyzer program 104 receives one or more contract parameters to be analyzed from computer system 110. For example, contract analyzer program 104 can receive the following contract parameters: product in line clauses, contract approvers, clauses from contract templates, external parties, terms from templates, reviewers, sub-status. In other embodiments, contract analyzer program 104 can receive a clause to be modified from one or more other components of computing environment 100.

In step 404, contract analyzer program 104 generates an estimated timeframe for the received contract. In this embodiment, contract analyzer program 104 can generate an estimated timeframe for the received contract for contract parameters like approvals, reviews, negotiation, etc. In this embodiment, contract analyzer program 104 accesses historic data from data store 106 and compares the respective contract parameters (i.e., the current contract parameters being analyzed to similar contract parameters of executed contracts) to generate an estimated timeframe for a received contract analysis request.

Continuing the example above, contract analyzer program 104 accesses data store 106, identifies contract parameters similar to the current contract parameters being analyzed, and compares the contract parameters being analyzed to similar contract parameters that have been executed. For example, contract analyzer program 104 can compare the contract parameters of product in line clauses, contract approvers, clauses from contract templates, external parties, terms from templates, and reviewers to previously executed contracts having one or more of the contract parameters of the contract parameters being analyzed and generate the following data: an average number of days for execution and an average period for each activity (e.g., negotiation, approval, and review). Contract analyzer program 104 can then generate an estimated timeframe for the received contract analysis request based, at least in part on the contract parameters and the average number of days for execution and an average period for each activity.

In step 406, contract analyzer program 104 identifies a root cause for delays in contract formation. In this embodiment, contract analyzer program 104 compares the estimated timeframe of the received contract to the actual timeline of the contract and attributes a delay to a contract parameter that has exceeded the estimated timeframe for completion. For example, based on the comparison, contract analyzer program 104 can identify that a contract parameter, such as "negotiation" has exceeded the estimated timeline and is now two weeks past the estimated timeline target date. Contract analyzer program 104 can then identify that "negotiation" is a likely cause of delay based, at least in part, on the contract parameters, the estimated time frame of the received contract, and the actual timeline of the contract.

In step 408, contract analyzer program 104 suggests an action for a user to take based, at least in part, on the identified root cause. In this embodiment, an action may be suggested contract language and/or an alert to a user to take specific action (e.g., setting a best possible value for terms, use alternate clauses instead of standard clause, user can contact an approver who rejected the changes, contact the legal team to finalize contract, change term values to reflect the capacity to deliver goods, use best rates suggested in analysis, etc.). Continuing the above example, contract analyzer program 104 can leverage the historic data stored in data store 106 to identify likely contract language that would be approved. In other embodiments, previous clause language modified by other parties during a contract activity (e.g., negotiation) can be displayed as a snapshot to show non-acceptable language that had the highest modifications or rejections from approvers of the contract.

Figure 5:
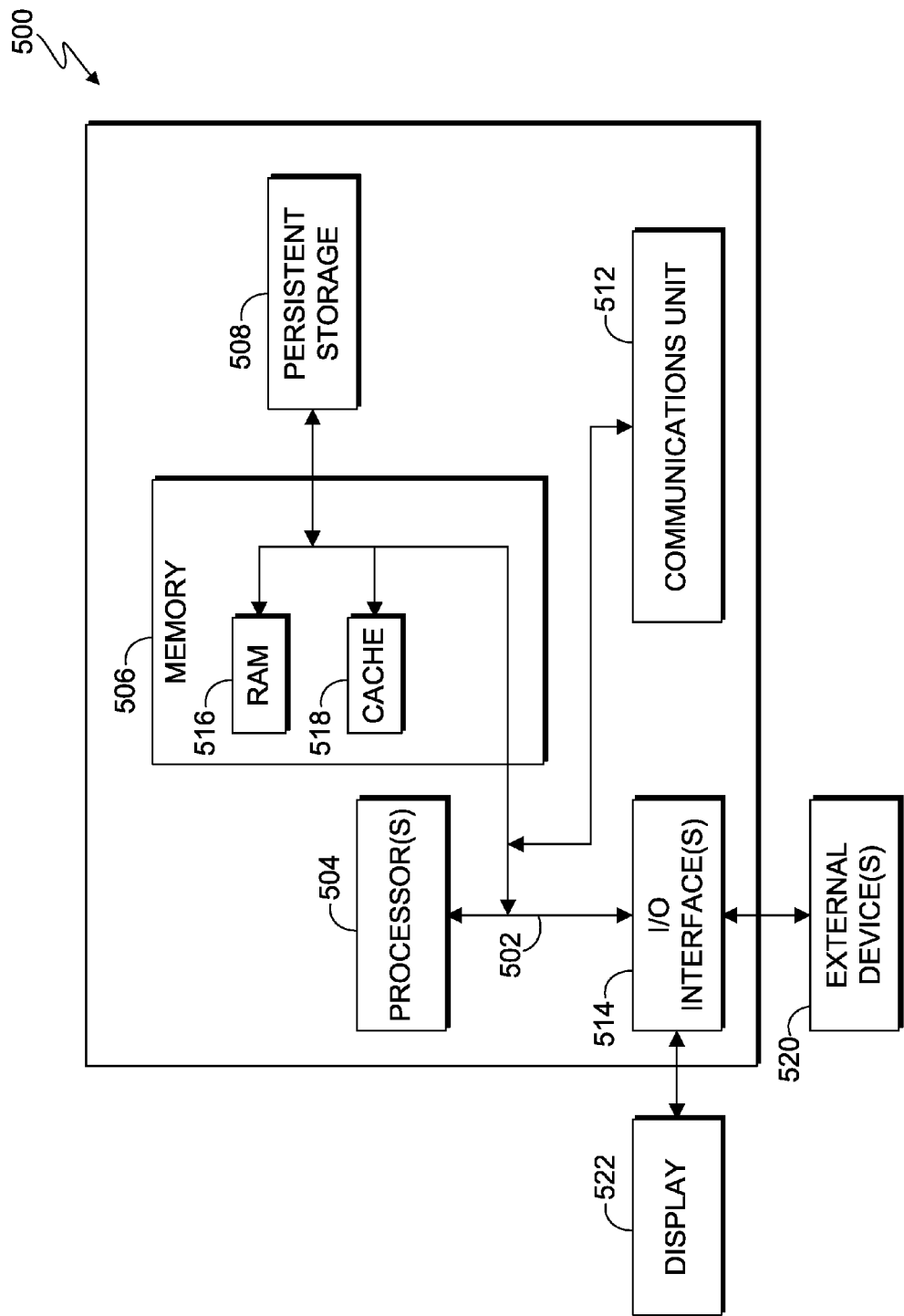
FIG. 5 is a block diagram of internal and external components of the computer systems of FIG. 1, in accordance with an embodiment of the present invention.

FIG. 5 is a block diagram of internal and external components of a computer system 500, which is representative of the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 708.

Communications unit 512 provides for communications with other computer systems or devices via a network (e.g., network 108). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more computer processors, one or more contract parameters of a contract via natural language processing, wherein each of the one or more contract parameters is associated with a specified threshold;
   mapping, by the one or more computer processors, the identified one or more contract parameters of the contract to a relational data structure;
   accessing, by the one or more computer processors, historic data comprising previously approved contract parameters;
   predicting, by the one or more computer processors, acceptable contract parameters based, at least in part, on the historic data and the specified threshold;
   suggesting, by the one or more computer processors, a first corrective action to increase a percentage of likelihood of success;
   responsive to receiving the first corrective action, tracking, by the one or more computer processors, modifications made by a user to contract language associated with the contract parameters of the contract;
   generating, by the one or more computer processors, an estimated timeframe for completion of the contract based, at least in part, on the historic data comprising the previously approved contract parameters, one or more predicted sources of delay, and whether the user has selected the first corrective action;
   responsive to generating the estimated timeframe for completion of the contract, displaying, by the one or more computer processors, the estimated timeframe for completion of the contract in-line with the contract;
   generating, by the one or more computer processors, a visual representation of the predicted acceptable contract parameters, the percentage of likelihood of success for the contract language associated with the contract parameters, the suggested first corrective action, and the estimated timeline; and
   displaying, by the one or more computer processors, the visual representation in-line with the contract.

2. The method of claim 1, wherein predicting, by the one or more computer processors, acceptable contract parameters based, at least in part, on the historic data and the specified threshold comprises:
   comparing, by the one or more computer processors, the historic data associated with the previously approved contract parameters to the contract parameters of the contract; and
   suggesting, by the one or more computer processors, the acceptable contract parameters based, at least in part, on the historic data associated with the previously approved contract parameters.

3. The method of claim 2, further comprising:
   responsive to reaching a configurable threshold of modifications to the contract parameters, suggesting, by the one or more computer processors, a corrective action to a user.

4. The method of claim 1, wherein generating, by the one or more computer processors, an estimated timeframe for completion of the contract comprises:
   comparing, by the one or more computer processors, the historic data associated with the previously approved contract parameters to the contract parameters of the contract; and
   generating, by the one or more computer processors, the estimated timeframe for completion based, at least in part, on the historic data associated with the previously approved contract parameters.

5. The method of claim 4, further comprising:
   identifying, by the one or more computer processors, one or more sources of delay in drafting the contract; and
   responsive to identifying the one or more sources of delay in drafting the contract, suggesting, by the one or more computer processors, a corrective action based, at least in part, on the identified one or more sources of delay.

6. A computer program product comprising:
   one or more computer readable storage media and program instructions stored on the one or more computer readable storage media, the program instructions comprising:
      program instructions to identify one or more contract parameters of a contract via natural language processing, wherein each of the one or more contract parameters is associated with a specified threshold;
      program instructions to map the identified one or more contract parameters of the contract to a relational data structure;
      program instructions to access historic data comprising previously approved contract parameters;
      program instructions to predict acceptable contract parameters based, at least in part, on the historic data and the specified threshold;
      program instructions to suggest a first corrective action to increase a percentage of likelihood of success;
      program instructions to, responsive to receiving the first corrective action, track modifications made by a user to contract language associated with the contract parameters of the contract;
      program instructions to generate an estimated timeframe for completion of the contract based, at least in part, on the historic data comprising the previously approved contract parameters, one or more predicted sources of delay, and whether the user has selected the first corrective action;
      program instructions to, responsive to generating the estimated timeframe for completion of the contract, display the estimated timeframe for completion of the contract in-line with the contract;

program instructions to generate a visual representation of the predicted acceptable contract parameters, the percentage of likelihood of success for the contract language associated with the contract parameters, the suggested first corrective action, and the estimated timeline; and program instructions to display the visual representation in-line with the contract.

7. The computer program product of claim 6, wherein the program instructions to predict acceptable contract parameters based, at least in part, on the historic data and the specified threshold comprise:

program instructions to compare the historic data associated with the previously approved contract parameters to the contract parameters of the contract; and program instructions to suggest the acceptable contract parameters based, at least in part, on the historic data associated with the previously approved contract parameters.

8. The computer program product of claim 7, the program instructions stored on the one or more computer readable storage media further comprise:

program instructions to, responsive to reaching a configurable threshold of modifications to the contract parameters, suggest a corrective action to a user.

9. The computer program product of claim 6, wherein the program instructions to generate an estimated timeframe for completion of the contract comprise:

program instructions to compare the historic data associated with the previously approved contract parameters to the contract parameters of the contract; and program instructions to generate the estimated timeframe for completion based, at least in part, on the historic data associated with the previously approved contract parameters.

10. The computer program product of claim 9, the program instructions stored on the one or more computer readable storage media further comprise:

program instructions to identify one or more sources of delay in drafting the contract; and program instructions to, responsive to identifying the one or more sources of delay in drafting the contract, suggest a corrective action based, at least in part, on the identified one or more sources of delay.

11. A computer system comprising:
one or more computer processors;
one or more computer readable storage media; and
program instructions stored on the one or more computer readable storage media for execution by at least one of the one or more computer processors, the program instructions comprising:

program instructions to identify one or more contract parameters of a contract via natural language processing, wherein each of the one or more contract parameters is associated with a specified threshold;

program instructions to map the identified one or more contract parameters of the contract to a relational data structure;

program instructions to access historic data comprising previously approved contract parameters;

program instructions to predict acceptable contract parameters based, at least in part, on the historic data and the specified threshold;

program instructions to suggest a first corrective action to increase a percentage of likelihood of success;

program instructions to, responsive to receiving the first corrective action, track modifications made by a user to contract language associated with the contract parameters of the contract;

program instructions to generate an estimated timeframe for completion of the contract based, at least in part, on the historic data comprising the previously approved contract parameters, one or more predicted sources of delay, and whether the user has selected the first corrective action;

program instructions to, responsive to generating the estimated timeframe for completion of the contract, display the estimated timeframe for completion of the contract in-line with the contract;

program instructions to generate a visual representation of the predicted acceptable contract parameters, the percentage of likelihood of success for the contract language associated with the contract parameters, the suggested first corrective action, and the estimated timeline; and program instructions to display the visual representation in-line with the contract.

12. The computer system of claim 11, wherein the program instructions to predict acceptable contract parameters based, at least in part, on the historic data and the specified threshold comprise:

program instructions to compare the historic data associated with the previously approved contract parameters to the contract parameters of the contract; and program instructions to suggest the acceptable contract parameters based, at least in part, on the historic data associated with the previously approved contract parameters.

13. The computer system of claim 12, the program instructions stored on the one or more computer readable storage media further comprise:

program instructions to, responsive to reaching a configurable threshold of modifications to the contract parameters, suggest a corrective action to a user.

14. The computer system of claim 11, wherein the program instructions to generate an estimated timeframe for completion of the contract comprise:

program instructions to compare the historic data associated with the previously approved contract parameters to the contract parameters of the contract; and program instructions to generate the estimated timeframe for completion based, at least in part, on the historic data associated with the previously approved contract parameters.

\* \* \* \* \*